United States Patent
Vontell

(10) Patent No.: US 9,581,033 B2
(45) Date of Patent: Feb. 28, 2017

(54) SURFACE MOUNTED FLEXIBLE HEATER FOR GAS TURBINE ENGINE APPLICATION

(75) Inventor: John H Vontell, Manchester, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 1984 days.

(21) Appl. No.: 11/702,715

(22) Filed: Feb. 6, 2007

(65) Prior Publication Data

US 2008/0185454 A1    Aug. 7, 2008

(51) Int. Cl.
| | | |
|---|---|---|
| B60H 1/00 | (2006.01) | |
| F01D 9/04 | (2006.01) | |
| F01D 5/18 | (2006.01) | |
| F01D 5/28 | (2006.01) | |
| F01D 25/02 | (2006.01) | |
| F02C 7/047 | (2006.01) | |

(52) U.S. Cl.
CPC .............. *F01D 9/041* (2013.01); *F01D 5/18* (2013.01); *F01D 5/288* (2013.01); *F01D 25/02* (2013.01); *F02C 7/047* (2013.01); *F05D 2300/501* (2013.01); *Y02T 50/672* (2013.01); *Y02T 50/673* (2013.01); *Y02T 50/676* (2013.01)

(58) Field of Classification Search
USPC ............ 219/543, 542; 237/80; 73/7, 112.01
See application file for complete search history.

(56) References Cited

U.S. PATENT DOCUMENTS

| | | | | |
|---|---|---|---|---|
| 3,288,983 A | * | 11/1966 | Lear, Sr. ............... | B64C 1/1476 219/203 |
| 3,435,500 A | * | 4/1969 | Manghirmalani ...... | B29C 63/42 432/230 |
| 4,774,150 A | | 9/1988 | Amano | |
| 5,288,355 A | * | 2/1994 | Leffel et al. ................... | 156/156 |
| 5,925,275 A | | 7/1999 | Lawson | |
| 6,974,641 B1 | * | 12/2005 | Choy et al. ................... | 428/704 |
| 7,291,815 B2 | * | 11/2007 | Hubert et al. ................ | 219/535 |

(Continued)

FOREIGN PATENT DOCUMENTS

| | | | | |
|---|---|---|---|---|
| DE | 29807260 U1 | * | 7/1998 | ............... F16L 11/04 |
| JP | 2004270484 A | * | 9/2004 | ............... F01D 5/28 |

(Continued)

OTHER PUBLICATIONS

James K. Sutter, et al., Erosion Resistant Coatings for Polymer Matrix Composites in Propulsion Applications, NASA/TM-2003-212201, Mar. 2003.*

(Continued)

*Primary Examiner* — Alissa Tompkins
*Assistant Examiner* — Phillip E Decker
(74) *Attorney, Agent, or Firm* — Carlson, Gaskey & Olds P.C.

(57) ABSTRACT

A surface mounted heater assembly for an aerospace component having a support layer, an electrically resistive heater foil element supported by the support layer, a coating covering the heater element; and an adhesive to secure said support layer to the component is provided. The coating has two layers that are visually distinct to permit identification of potential exposure of the heater foil element. A surface mounted heater having a multiple layer assembly having a support layer; a heater element and a transition layer to couple the support layer to the aerospace component is provided.

5 Claims, 3 Drawing Sheets

(56) References Cited

U.S. PATENT DOCUMENTS

| | | | |
|---|---|---|---|
| 7,763,833 B2* | 7/2010 | Hindel et al. | 219/528 |
| 7,789,620 B2* | 9/2010 | Vontell, Sr. et al. | F01D 5/18 |
| | | | 415/178 |
| 2003/0118440 A1 | 6/2003 | Zhao | |
| 2007/0187381 A1* | 8/2007 | Vontell et al. | 219/202 |
| 2009/0149997 A1* | 6/2009 | Stothers | 700/275 |
| 2010/0008788 A1* | 1/2010 | Barbee et al. | 416/224 |
| 2011/0000183 A1* | 1/2011 | Dimelow et al. | 60/39.091 |

FOREIGN PATENT DOCUMENTS

| | | | | |
|---|---|---|---|---|
| JP | 2005146291 A | | 6/2005 | |
| JP | 2005226539 A | * | 8/2005 | F01D 5/28 |
| WO | 00/06796 A1 | | 2/2000 | |
| WO | 2005019601 A1 | | 3/2005 | |

OTHER PUBLICATIONS

DE 29807260 U1, Jul. 1998, English translation.*
European Search Report dated Jul. 29, 2010.

* cited by examiner

SURFACE MOUNTED FLEXIBLE HEATER FOR GAS TURBINE ENGINE APPLICATION

This invention was made with Government support under Contract Number N00019-02C-3003. The Government has certain rights in this invention.

BACKGROUND OF THE INVENTION

1. Field of the Invention

The present invention is related to a flexible heater assembly for an aerospace component. More particularly, the present invention relates to flexible heater assembly for an aerospace component that includes erosion protection and erosion indication in an aerodynamic and ingestion resistant optimized assembly.

2. Description of Related Art

The operating environment of aerospace components, particularly, gas turbine engine components is exceedingly harsh and demanding. The temperatures and liquid water content that the components are exposed to in the path of the air stream through the engine can result is ice accretion. In such environments electro-thermal ice protection systems are needed to protect the engine components from damage caused by ingestion of accreted ice pieces.

Present surface mounted applications to protect gas turbine engine components have drawbacks. The machinable silicone rubbers presently used for such purposes suffer from high erosion. Further, current surface mounted heaters are non-structural and occupy valuable space in the jet turbine engine that is optimally reserved for structural components that would ensure greater structural strength and aerodynamic performance of the engine. Additionally, silicone elastomers with improved erosion resistance used for surface mounted applications are highly detrimental to the life of the rotating jet turbine blades in the event that the adhesive that secures the heater element to the engine component fails. Still further, electrical injuries are a concern for maintenance personnel from hard particle erosion or localized damage, because removal of the silicone layer over the heating element does not cause electrical failure although components are electrically active.

Accordingly there is a need for an surface mounted flexible heater for gas turbine engine applications that offers high erosion resistance, minimum reduction of component structural strength and aerodynamic performance while minimizing its ingestion risk and potential mechanical failure.

SUMMARY OF THE INVENTION

It is an object of the present invention to provide a surface mounted heater assembly for a gas turbine engine component that provides erosion protection and erosion indication together with a readily gas turbine machinable polymer support and adhesive.

It is another object of the present invention to provide a surface mounted heater assembly for a gas turbine engine component that provides high erosion protection with minimized ingestion risk.

It is also an object of the present invention to provide a surface mounted heater assembly for an engine component that is capable of abrading during engine operation to prevent mechanical damage to rotating gas turbine engine blades.

It is a yet another object of the present invention to provide a surface mounted heater assembly for a gas turbine engine component that minimizes the overall thickness of the assembly and protects against erosion and minimizes ingestion risk.

It is yet still another object of the present invention to provide a surface mounted gas turbine engine heater assembly for an component that employs both erosion resistance and erosion indication to enable detection of potential electrical malfunction.

It is still yet another object of the present invention to provide a surface mounted heater assembly for a gas turbine engine component that employs a transition layer between a machinable adhesive when used with a co-molded composite structure.

It is still yet another object of the present invention to provide a surface mounted heater assembly for a gas turbine engine component that employs a transition layer between a machinable adhesive and a co-molded composite structure that is a structural component.

These and other objects and advantages are provided by a surface mounted heater assembly for an aerospace component having a support layer, an electrically resistive heater foil element supported by the support layer, a coating covering the heater element; and an adhesive to secure said support layer to the component. The coating has two layers that are visually distinct to permit identification of potential exposure of said heater foil element. A surface mounted heater for an aerospace component having a multiple layer assembly having a support layer; a heater element supported by the support layer and a protective coating covering the heater element. The multiple layer assembly further comprises a transition layer to couple the support layer to the aerospace component.

BRIEF DESCRIPTION OF THE DRAWINGS

These and other features and advantages of the present disclosure will be appreciated and understood by those skilled in the art from the following detailed description, drawings, and appended claims.

DETAILED DESCRIPTION OF THE INVENTION

Figure 1:
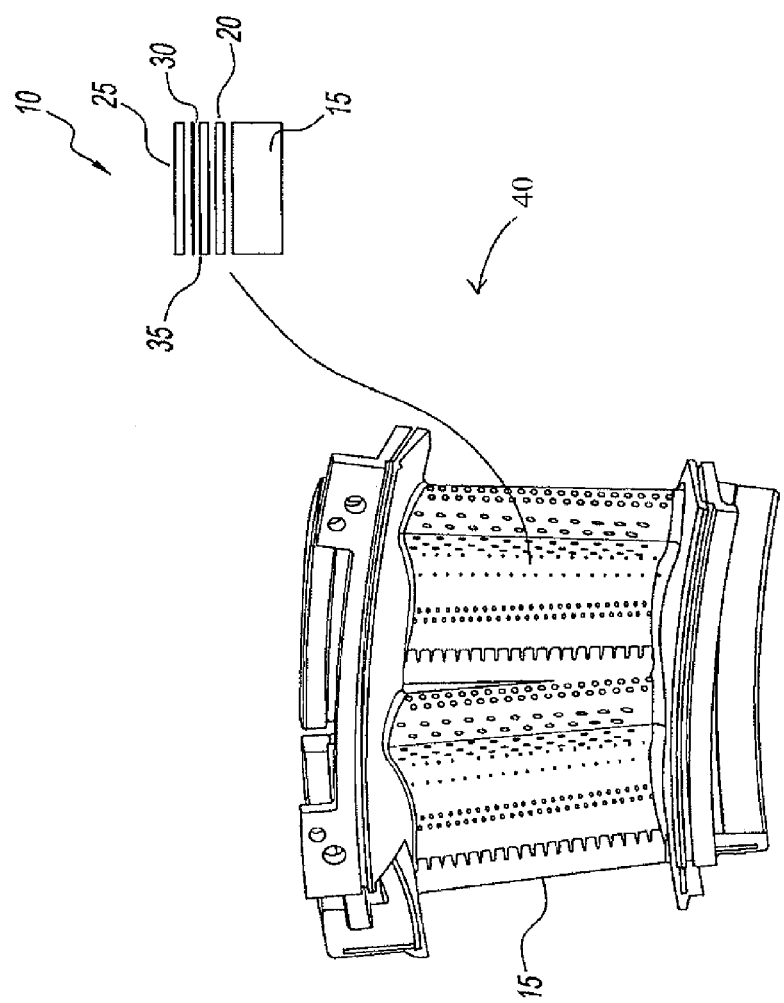
FIG. 1 illustrates a gas turbine engine air foil having a conventional surface mounted heater shown in detail.

Referring to the drawings and in particular to FIG. 1, a conventional surface mounted heater assembly for a gas turbine engine air foil component is shown in detail, generally represented by reference numeral 10. Heater assembly 10 is affixed to a air foil 15 by an adhesive layer 20. Adhesive layer 20 connects the air foil to heater assembly 10. The upper most gas flow contacting layer is a silicone cover layer 25. Cover layer 25 protects heater element 30. Heater element 30 is supported by silicone support 35. Air foil 15 is part of a larger gas turbine engine component, such as for example a gas turbine engine air foil vane component 40.

Traditionally, heater element 30 is an electrically resistive metal foil of a material such as titanium, a titanium alloy, a copper alloy, nickel or nickel alloys. The entire heater assembly 10 is a flexible surface mounted assembly typically consisting of a copper or nickel alloy heater element, a calendered silicone support reinforced with a glass scrim cloth incorporated during the calendaring process and a calendered silicone cover layer. Heater element 30 is then bonded to air foil 15 using adhesive 20 commonly used for such applications. Primers may be used to increase the adhesion. Assembly 10 has a thickness of approximately 0.002-0.005 inch.

Numerous disadvantages exist with this conventional configuration that uses a silicone rubber for cover layer 25 that is not very erosion resistant. Accordingly, a relatively thick layer of silicone rubber is required at a minimum thickness of 0.010 to 0.020 inch to achieve sufficient gas turbine component erosion durability. Further, the entire surface mounted heater assembly 10 is relatively thick. The entire surface mounted heater assembly 10 including cover layer 25, the heater element 30, support layer 35 and adhesive 20 is about 0.030-0.060 inch thick. In the relatively, confined space of the turbine engine, such a thickness occupies volume that could be used for structural load bearing components of the engine. Accordingly, engines that must use a thick heater assembly such as the conventional configuration, compromise structurally integrity and aerodynamic performance.

Additionally, silicone elastomers with improved erosion resistance used for surface mounted applications are highly detrimental to the life of the rotating jet turbine blades in the event that adhesive 20 that secures the heater element to the engine component fails. Any liberation of the heater assembly into the rotating jet turbine blades could completely destroy or substantially reduce the performance of the engine.

Still further, electrical injuries are a concern for maintenance personnel when the cover layer is removed by hard particle erosion or localized damage. In conventional heater assembly 10, the removal of the silicone layer over the heating element may not cause electrical failure and components remain electrically active without sufficient electrical insulation. Such a scenario poses hazards to the maintenance personnel.

Figure 2:
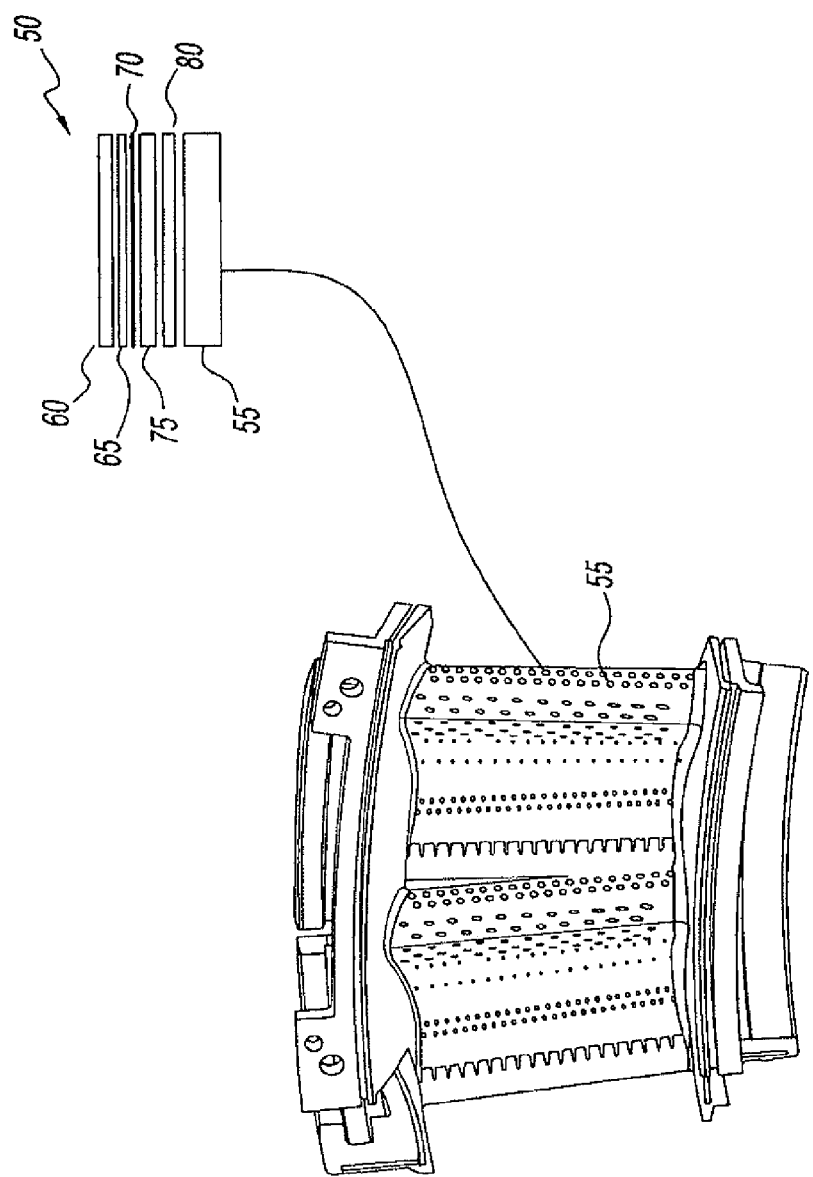
FIG. 2 illustrates a gas turbine engine air foil having a surface mounted heater shown in detail according to a first embodiment of the present invention.

Referring the FIG. 2, the first embodiment of the heater assembly of the instant invention, generally referred to by reference numeral 50, is shown. Heater assembly 50 is affixed to a gas turbine engine component such as an air foil 55 that is in the gas path. Heater assembly 50 has two layers, or a protective coating, directed to erosion resistance of heater assembly 50, erosion protection layer 60 and erosion indicator layer 65. Immediately beneath protective layers 60 and 65, is heater element 70. Heater element 70, such as an electrically resistive layer, is directly between erosion indicator layer 65 and gas turbine machinable support layer 75. Support layer 75 is affixed to air foil 55 by a turbine machinable adhesive 80. Heater assembly 50 is shown as being affixed to air foil 55 of a gas turbine engine stage 85; however, the heater assembly 50 of the instant invention could be affixed to any aerospace component, especially those components that are subjected to the gas turbine engine gas path.

Erosion protector layer 60 is immediately adjacent the gas flow and is preferably a polymer layer that is erosion resistant. Fluorocarbon elastomers are preferably used on the heater assembly surface because they offer erosion protection to the underlying heater element 70 and air foil 55. Erosion protection layer 60 is preferably formed from a solvated elastomer formulated for erosion resistance and is preferably approximately equal to or greater than 0.005 inch thick. For example, PLV2100 solution, a product of Pelseal Corporation, is capable of providing erosion resistance. Layer 60 is applied by conventional techniques such as spraying, electrostatic spraying, roll coating and powder coating to achieve sufficient adhesion to the erosion indicator layer 65 and 6 control the thickness. Primers applied per manufacturers instructions may be used to achieve sufficient adhesion.

Erosion indicator layer 65 is preferably an erosion resistant polymer layer that is inherently a different color than erosion protector layer 60. Alternatively, erosion indicator layer 60 has an additional electrically non-conductive chemical compound added to modify its color when inspected with electromagnetic radiation such as visible light, ultraviolet or infrared light to enable viewing. In any case, erosion indicator layer 65 is visually distinct from erosion protector layer 60 to ensure detection of any defect in erosion protector layer 60 that could lead to injury of personnel. Were erosion indicator 65 not present, hard particle erosion or localized damage due to impacts would remove the polymer surface covering the heating element without causing an electrical failure, as in the conventional flexible heater silicone coatings. Without electrical failure, the heater assembly diagnostics could not detect the damage resulting from an electrically active jet turbine component surface that could harm maintenance personnel.

Erosion indicator layer 65 is also applied by any conventional means such as spraying, electrostatic spraying, roll coating and powder coating techniques. The thickness of erosion indicator layer 65 is approximately from 0.0005-0.005, and more narrowly, 0.0005-0.001 inch to achieve sufficient adhesion to erosion protector layer 60 and heater element 70. Primers applied per manufacturers instructions may be used to achieve sufficient adhesion. Additionally sufficient erosion indicator layer 65 is applied to provide electrical isolation from personnel at the heater operational voltage and wattage. This combination of erosion protection layer 60 and erosion indicator layer 65 provide needed erosion resistance in the gas turbine engine gas path lengthening the service life of the air foil.

Heater element 70 is an electrically resistive foil metal heater element that is preferably made from a material such as but not limited to titanium, titanium alloys, copper alloys, nickel and nickel alloys. Heater element surface is prepared for bonding using chemical etches, plasma etches and primers appropriate to the heater element 70 alloy. Heater element 70 has a thickness of approximately 0.0005-0.005 inch.

Heater element 70 is connected to a support layer 75. Support layer 75 is preferably a polymer layer that supports heater element 70 during processing. Support layer 75 is of sufficient strength to withstand service under engine operating conditions. However, support layer 75 must also be machinable by the turbine blades if ingested to minimize or eliminate engine damage should it become separated from air foil 55. Support layer 75 is preferably made from a polymer that supports heater element 70 during chemical milling operations. The support layer 75 can be a polymer film or calendered sheet applied by conventional autoclave or compression molding methods. Support layer 75 can be polymer powder applied by conventional methods such as powder coating. Support layer 75 can be polymer film formed by evaporation of a solution applied by conventional methods such as spraying, electrostatic spraying, and roll coating. Preferably, all forms are applied at a thickness sufficient to support the heater element 70 during chemical milling operations and achieve sufficient adhesion to adjacent materials typically 0.001 inch to 0.010 inch. Primers applied per manufacturers instructions may be used to achieve sufficient adhesion.

Machinable adhesive 80 secures heater assembly 50 to engine component 55. Machinable adhesive 80 is preferably a polymer adhesive that bonds the support layer 75 to air foil 55 with sufficient strength for durable service under the operating conditions of the jet air stream. Accordingly, a polymer that is durable yet machinable by the turbine blades is used to minimize or eliminate engine damage during potential ingestion. The machinable adhesive 80 can be a calendered sheet applied by conventional autoclave or compression molding methods. Machinable adhesive 80 can be a polymer film formed by evaporation of a solution applied by conventional methods such as spraying, electrostatic spraying, and roll coating. Machinable adhesive 80 can be a polymer powder applied by conventional means such as powder coating techniques. Preferably, all forms are applied at a thickness of typically 0.0005 inches to 0.010 inches. Primers applied per manufacturers instructions may be used to achieve sufficient adhesion. The overall thickness of the heater assembly 50 is approximately 0.007 inches to 0.035 inches; although, the upper limit is determined by the amount of space available.

The heater assembly 50 of the first embodiment is intended for applications where the gas turbine engine air foil 55 or other component is a fiber reinforced polymer, metal or ceramic matrix composite or a fabricated metal structure. To affix heater assembly 50 to air foil 55, support layer 75, for example a fluorocarbon solution, is spray applied to a 0.001 inch thick CP titanium foil heater 70. Support layer 75 is then cured to provide the support required for chemical milling of the heater element 50. The thickness of support layer 75 is approximately from 0.001 to 0.010 inch.

After being chemically milled, exposed heater element 50 is spray coated with an approximately 0.001 inch thick layer of erosion indicator layer 65 and then erosion protector layer 60. The outermost erosion protector layer 60 is approximately 0.009 inch in thickness. Layers 60 and 65 are thermally cured. Machinable adhesive 80 is then preferably spray coated to support layer 75 at a thickness of approximately 0.004 inch. The uncured adhesive 80 is laid onto air foil 55 and thermally cured using externally applied pressure, temperature and vacuum. Alternative methods for applying the flexible surface mounted heater assembly 50 could alternatively be used.

The overall thickness of the heater assembly 50 of the first embodiment is approximately 0.007 inch to 0.035 inch. The upper limit is determined by the amount of space available. The overall thickness of the convention heater 9 assembly for gas turbine components has a thickness range of 0.030 to 0.060 inch. The benefit of reduced thickness is highly significant in the confined regions within the gas turbine engine. Reduced thickness, permits greater structural support for the turbine and increased aerodynamic performance. Furthermore, the combination of erosion protector 60 and erosion indicator 65 in the path of the air stream result in extended service life of the gas turbine component. Erosion indicator 65 permits easy inspection for erosion for damage while increasing safety for maintenance personnel. The materials used for the polymer support layer 75 reduce turbine damage during potential ingestion.

Figure 3:
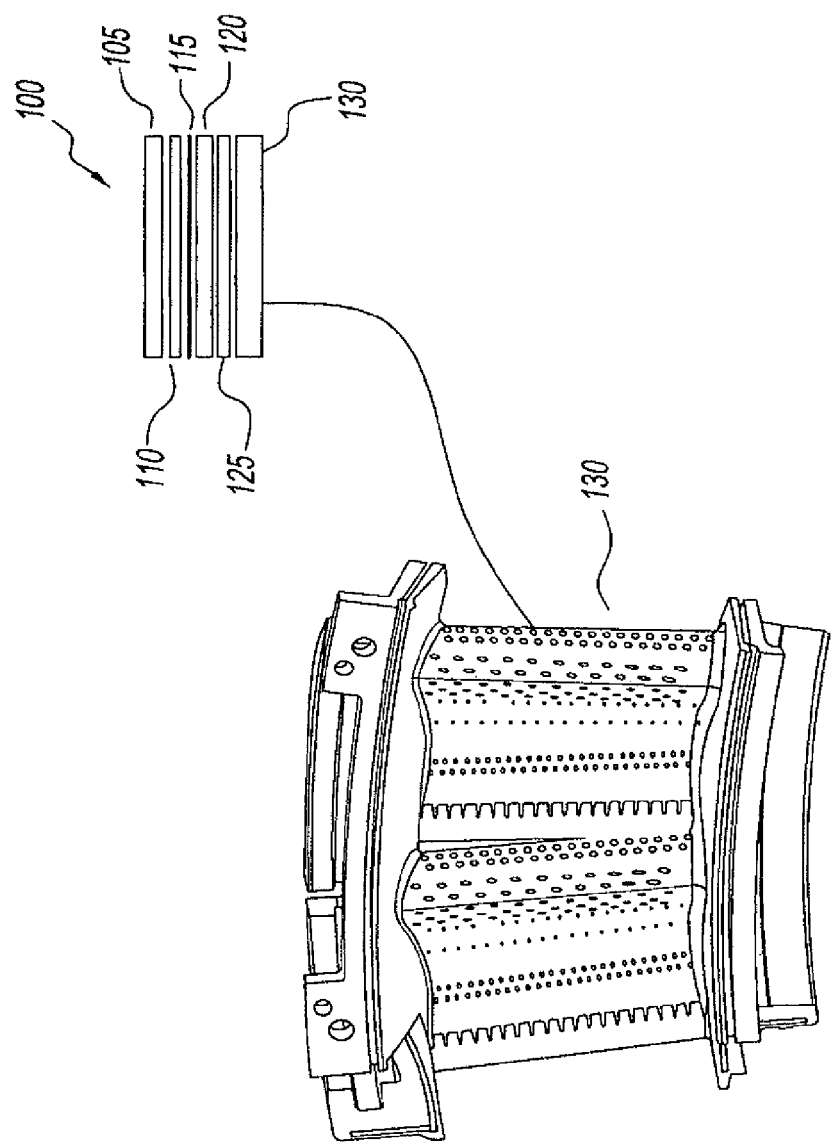
FIG. 3 illustrates a gas turbine engine air foil having a surface mounted heater shown in detail according to a second embodiment of the present invention.

Referring to FIG. 3, a second embodiment of heater assembly generally resented by reference numeral 100, is shown. Heater assembly 100 incorporates elements 105 erosion protector layer, erosion indicator layer 110, heater element 115 and machinable support 120 layer, similar to first embodiment. Heater assembly 100 further includes a transition layer 125. Transition layer 125 is required when heater assembly 100 is co-molded during fabrication of a polymer matrix composite gas turbine component such as an air foil 130 or secondarily attached with a conventional thermoset adhesive.

Transition layer 125 is preferably a fabric layer such as a glass fabric layer that is coated on one side adjacent to the machinable support layer 120 with a machinable adhesive. The machinable adhesive amount is sufficient to adhesively attach the transition layer to the heater assembly. Additionally the transition layer retains sufficient fabric volume to allow partial impregnation of the transition layer with the adhesive or composite matrix resin during the heater attachment procedures. The second side of transition layer 125, proximate gas turbine component is secondarily attached using thermoset polymers such as polyurethane, epoxy, bismaleimide, phthalonitrile or polyimide or co-molded with a thermoset composite structure such as epoxy, phthalonitrile, polyimide or bismaleimide reinforced with graphite or ceramic fibers. The composition and bismaleimide reinforced with graphite or ceramic fibers. The composition and thickness of transition layer 125 is approximately 0.004 inch and contributes to the structural requirements of the gas turbine engine component. Additionally the transition layer can be integrated into the support layer.

In the second embodiment, support layer 120 is applied by spraying heater element 115 and then curing the support layer 120 in preparation for further chemical milling. Support layer 120 is preferably sprayed to heater element 115 at a layer of approximately 0.005 inch. The heater element 115 is preferably CP titanium and has a thickness of approximately 0.001 inch.

After being chemically milled, exposed heater element 115 is spray coated with an approximately 0.001 inch thick layer of erosion indicator layer 110 and then erosion protector layer 105. The outermost erosion protector layer 105 is approximately 0.005 inch to 0.020 inch in thickness, although the upper limit of the range is determined by the amount of space available. Layers 105 and 110 are thermally cured.

Transition layer 125 is spray coated, powder coated or roll coated with machinable adhesive at a thickness of approximately 0.0001 inch to 0.005 inch. Transition layer 125 is bonded to support surface of heater assembly 100. For a dry assembly process such as resin transfer molding the assembly is stacked with the composite component fabric and fabricated using appropriate tooling and processes. Alternatively, the co-molding process could involve a pre-impregnated process such as autoclave or compression molding.

The benefits of the heater assembly 100 of the second embodiment in comparison to the conventional are identical. Further, the co-molded heater assembly 100 of the second embodiment reduces costs in comparison to the conventional heater assembly by eliminating operations associated with secondarily bonding such as mechanically abrading, solvent cleaning and priming. Further the transitional layer having a thickness of 0.004 inch contributes to the composite structure, thus providing a load bearing element. Additionally, the fluorocarbon erosion indicator and erosion protection layer eliminate the bonding contamination typically introduced by the use of silicones.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the disclosure will include all embodiments falling within the scope of the appended claims.

I claim:

1. A surface mounted heater assembly for an aerospace component comprising:
   a support layer, wherein said support layer has a thickness within a range of 0.001 to 0.010 inches;
   an electrically resistive heater foil element supported by said support layer, wherein said heater foil element has a thickness within a range of 0.0005 to 0.005 inches;
   a coating covering said heater element;
   an adhesive to secure said support layer to said component, wherein said adhesive has a thickness within a range of 0.0005 to 0.010 inches, wherein said coating comprises two layers, said two layers being visually distinct to permit identification of potential exposure of said heater foil element, one of said two layers is an erosion protection layer, the other of said two layers being an erosion indicator layer, said erosion protection layer being exposed to a gas turbine flow path, wherein said erosion protection layer has a thickness within a range of 0.005 to 0.009 inches, and wherein said erosion indicator layer has a thickness within a range of 0.0005 to 0.001 inches; and
   wherein said erosion protection layer, said erosion indicator layer, said support layer, said heater layer and said adhesive have a total thickness within a range of 0.007 to 0.035 inches.

2. The heater assembly of claim 1, wherein said heater element is made from a material selected from the groups consisting of titanium, titanium alloys, copper, copper alloys, nickel and nickel alloys.

3. The heater assembly of claim 1, wherein said erosion protection layer, said erosion indicator layer, said support layer and said adhesive comprise a polymer.

4. The heater assembly of claim 3, wherein said polymer being applied by a method selected from the group consisting of spraying, electrostatic spraying, roll coating and powder coating.

5. The heater assembly of claim 1, wherein said support layer is directly secured to said component by said adhesive.

* * * * *

UNITED STATES PATENT AND TRADEMARK OFFICE
CERTIFICATE OF CORRECTION

PATENT NO. : 9,581,033 B2
APPLICATION NO. : 11/702715
DATED : February 28, 2017
INVENTOR(S) : John H Vontell Page 1 of 1

It is certified that error appears in the above-identified patent and that said Letters Patent is hereby corrected as shown below:

In the Claims

In Claim 1, Column 8, Line 8; after "said support layer," replace "said heater layer" with --said heater element--

Signed and Sealed this
First Day of August, 2017

Joseph Matal
*Performing the Functions and Duties of the*
*Under Secretary of Commerce for Intellectual Property and*
*Director of the United States Patent and Trademark Office*